United States Patent [19]

Kreuter

[11] Patent Number: 4,957,238

[45] Date of Patent: Sep. 18, 1990

[54] PNEUMATIC VARIABLE AIR VOLUME CONTROLLER

[75] Inventor: Paul E. Kreuter, Goshen, Ind.

[73] Assignee: Kreuter Mfg. Co., Inc., New Paris, Ind.

[21] Appl. No.: 428,951

[22] Filed: Oct. 30, 1989

[51] Int. Cl.$^5$ .............................................. F24F 13/14
[52] U.S. Cl. ................................... 236/49.4; 137/487; 236/80 R
[58] Field of Search ............................. 236/49.4, 80 R; 137/487

[56] References Cited

U.S. PATENT DOCUMENTS

| | | | |
|---|---|---|---|
| 3,719,321 | 3/1973 | McNabney | 236/49 |
| 3,806,027 | 4/1974 | Gunn et al. | 236/49.4 |
| 3,941,310 | 3/1976 | Travaglio et al. | 236/49 |
| 4,077,567 | 3/1978 | Gunn et al. | 236/49.4 |
| 4,147,298 | 4/1979 | Leemhuis | 236/49 |
| 4,263,931 | 4/1981 | Bramow et al. | 137/84 |
| 4,264,035 | 4/1981 | Maxson et al. | 236/87 |
| 4,284,237 | 8/1981 | Harris et al. | 236/49.4 |
| 4,291,832 | 9/1981 | Gunn et al. | 236/49.4 |
| 4,384,492 | 5/1983 | Kreuter | 73/861.48 |
| 4,406,397 | 9/1983 | Kamata et al. | 236/1 B |
| 4,422,571 | 12/1983 | Bowman | 236/49 |
| 4,467,956 | 8/1984 | Kreuter | 236/49 |
| 4,627,569 | 12/1986 | Morris | 236/49.4 |
| 4,634,047 | 1/1987 | Dean | 236/49.4 |
| 4,637,546 | 1/1987 | De Meyer | 236/49.4 |

Primary Examiner—William E. Tapolcai
Attorney, Agent, or Firm—Kinney & Lange

[57] ABSTRACT

In a pneumatic variable air volume controller, a linear relationship is achieved between the actual air velocity in a duct carrying conditioned air to a defined area and a pneumatic pressure signal representing the temperature in that area; and this linear relationship is used to vary the volume of air flowing in the duct. This is achieved by comparing a pneumatic pressure control signal which is a linear representation of the velocity pressure in the duct to a pneumatic pressure control signal which varies as the square of a thermostat pneumatic pressure signal which itself varies in a linear manner with respect to the temperature in the controlled area.

11 Claims, 4 Drawing Sheets

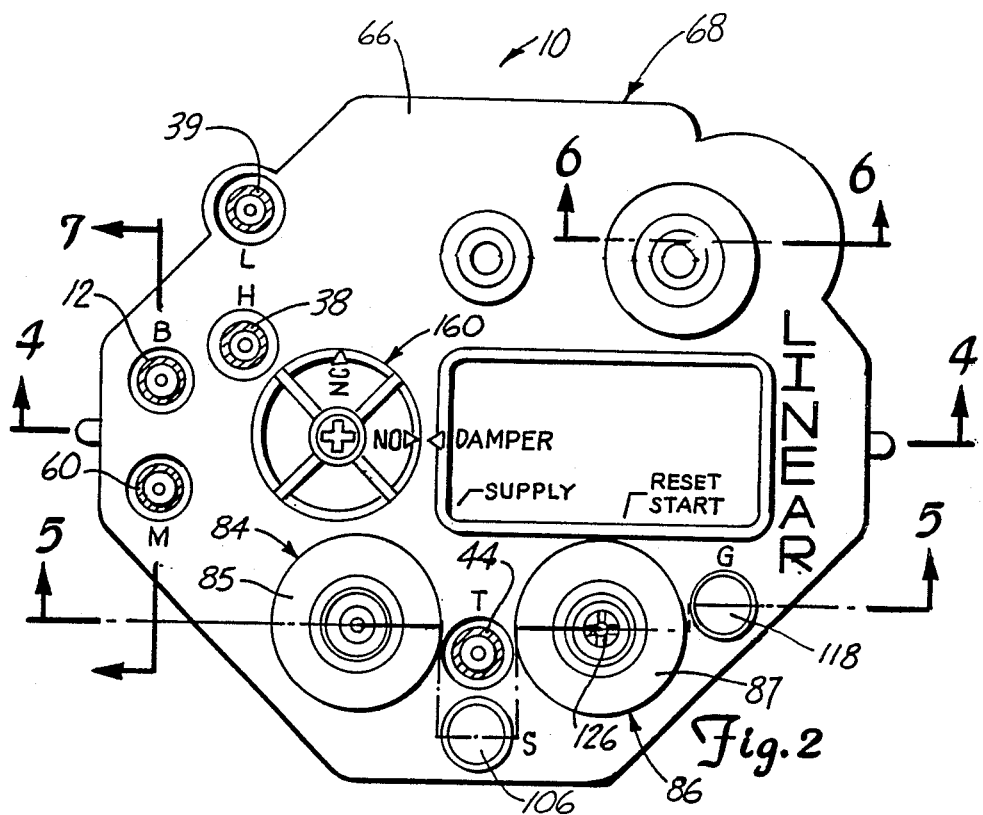
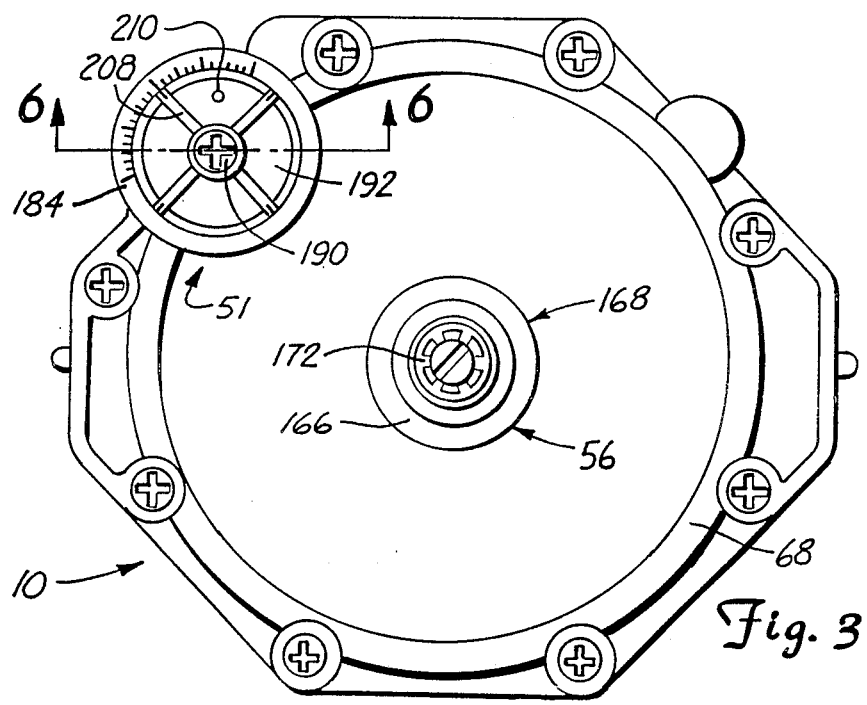

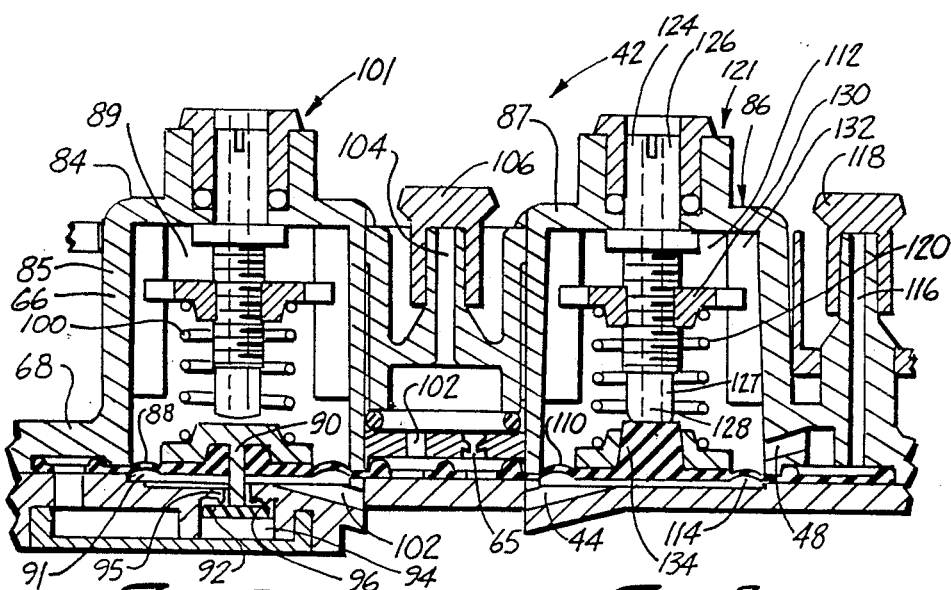
Fig. 5
Fig. 7
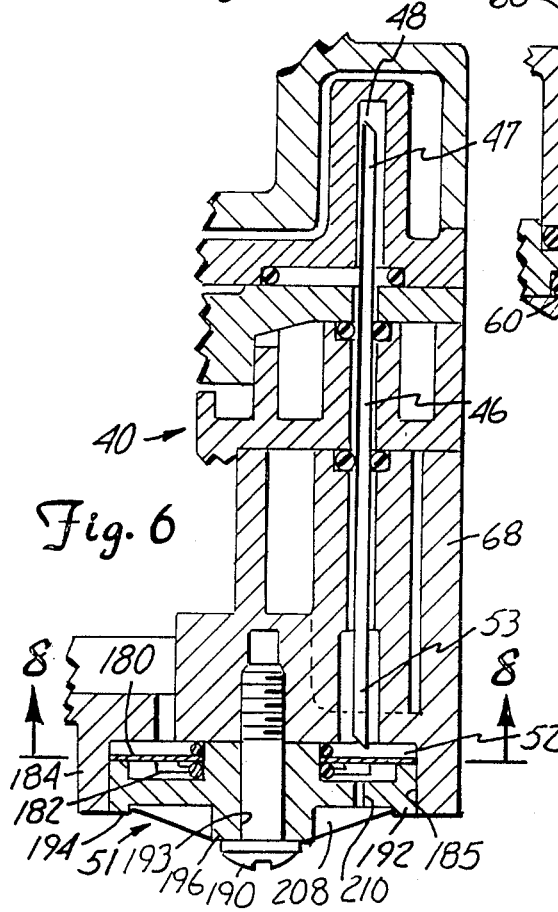
Fig. 6
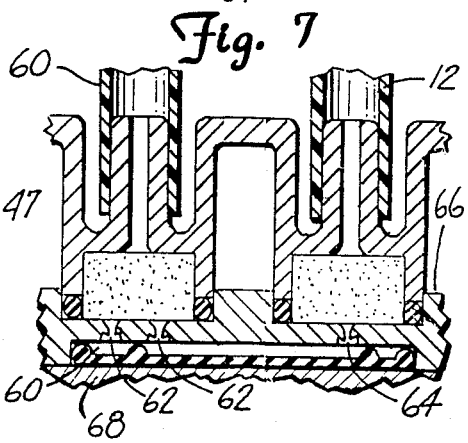
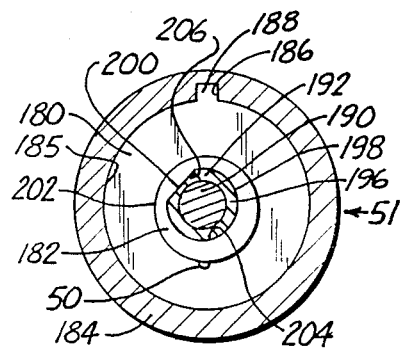
Fig. 8

PNEUMATIC VARIABLE AIR VOLUME CONTROLLER

BACKGROUND OF THE INVENTION

1. Field of the Invention

This invention has relation to a pneumatic variable air volume controller for regulating the supply of conditioned air through a passage to a defined area; and particularly to a controller for achieving a linear relationship between a pneumatic signal from a thermostat in the defined area and the actual velocity of air flowing in the passage.

2. Description of the Prior Art

It is known to use a damper to control the flow of conditioned air through a passage or duct into a defined area to be treated by conditioned air, and to adjust the rate of such flow responsive to a pneumatic signal from a thermostat in the defined area, the thermostat signal being representative of the desired temperature in the area. This has been done by developing a first pneumatic pressure signal representative of the velocity pressure (total pressure minus static pressure) in the passage or duct, comparing this first signal pressure to a second pneumatic pressure signal from the thermostat, developing a third pneumatic pressure signal representative of the difference between the first two signals and supplying this third signal to a damper actuator to open or close a damper according to such pressure differences. See the following U.S. Pat. Nos.: 3,719,321, granted to McNabney on Mar. 6, 1973; U.S. Pat. No. 3,941,310, granted to Traviglo et al on Mar. 2, 1976; U.S. Pat. No. 4,077,567, granted to Ginn et al on Mar. 7, 1978; U.S. Pat. No. 4,384,492, granted to Kreuter on Mar. 23, 1983; and U.S. Pat. No. 4,467,956, also granted to Kreuter but on Aug. 28, 1984.

It is known that the actual air velocity in a duct (in feet per minute, for example) varies as the square root of the air velocity pressure in the duct.

In the past, in order to achieve a linear relationship between the actual air velocity in a duct carrying conditioned air and a pneumatic pressure signal from a thermostat, a first pneumatic pressure signal representative of the square root of the velocity pressure was developed and compared in a differential pressure measuring device to a second pneumatic pressure signal from the thermostat. See U.S. Pat. No. 4,384,492, granted to Kreuter on May 24, 1983. The disclosure of this patent is incorporated herein by this reference to it. Such a structure proved very effective; but it is too expensive for certain applications. For that reason, among others, the structure of the present invention was developed.

Other patents known to the applicant and those in privity with him and which show some of the isolated elements which are part of the combination making up this present invention are U.S. Pat. Nos.: 4,263,931, granted to Bramow et al on April 28, 1981; and U.S. Pat. No. 4,264,035, granted to Maxon et al, also on Apr. 28, 1981.

Patents which appear to be at least somewhat related to the field of the invention are: U.S. Pat. Nos.: 4,147,298, granted to Leemhuis on Apr. 3, 1979; U.S. Pat. No. 4,406,397, granted to Kamata on Sept. 27, 1983; and U.S. Pat. No. 4,422,571, granted to Bowman on Dec. 27, 1983. They are not believed to be as pertinent as the prior art discussed above.

SUMMARY OF THE INVENTION

An object of the present invention is to achieve a linear relationship between: (1) actual air velocity in a duct carrying conditioned air to a defined area, and (2) a pneumatic pressure signal from a thermostat representing the temperature in that area; and to use this relationship to vary the volume of air flowing in the duct.

An even broader object is to achieve a linear relationship between : (1) actual air velocity in a duct, and (2) any pneumatic pressure signal which is a linear representation of another measurable condition.

To achieve the first object, a first pneumatic pressure control signal which is a linear representation of the velocity pressure in a duct is compared to a second pneumatic pressure control signal which varies as the square of a thermostat signal. A pneumatic pressure output signal representative of the difference between the first and second control signals is developed in a pneumatic differential signal generator, and this signal will then reflect the linear relationship between the actual air velocity in the duct and the thermostat signal.

It is known that the actual air velocity V in a duct varies as the square root of the velocity pressure P in the duct. The velocity pressure P is equal to the total pressure H in the duct less the static pressure L in that duct; or $V = K_4 \sqrt{(H-L)}$; or $V = K_4 \sqrt{P}$. The velocity pressure P is used as the first pneumatic pressure control signal in the controller of the invention.

It is known that air flow through an orifice resembles the square root of the pressure across the orifice; and it is known that the flow through a capillary such as a capillary tube is directly proportional to the pressure across that capillary.

According to the present invention, a pneumatic pressure signal X which is directly proportional to a thermostat pneumatic pressure signal T is fed through a capillary, into a pneumatic pressure control signal conduit and out of that conduit to the atmosphere through a control orifice which can be an adjustable orifice. The pressure Y in this pneumatic pressure control signal conduit between the capillary and the control orifice is used as the second pneumatic pressure control signal in the controller of the invention.

From the above it follows that the flow f through the control orifice resembles the square root of the pressure across the orifice, or $f = K_1 \sqrt{Y}$.

Also flow f through the capillary is

Also flow f through the capillary is proportional to the pressure across it or $f = K_2(X-Y)$. The flow through the capillary continues on through the pneumatic pressure control signal conduit and is, therefore, the same flow that passes out through the control orifice. Therefore, $f = K_1 \sqrt{Y} = K_2 (X-Y)$; or $X = Y + K_3 \sqrt{Y}$.

But the second pneumatic pressure control signal Y can be shown to be very small compared to the thermostat pressure signal X, so that effectively $X = K_3 \sqrt{Y}$. Also, $X^2 = K_4 Y$.

Since V, the actual air velocity, varies as the square root of the velocity pressure P (the first pneumatic pressure control signal) and since Y (the second pneumatic pressure control signal), varies as the square of X (a linear representation of the thermostat pressure T), it follows that the variations in the first and second pneumatic pressure control signals are squared representations of the actual air velocity and of the thermostat temperature, respectively.

In a differential pressure comparator, the second pneumatic pressure control signal Y is compared with the first pneumatic pressure control signal P. In a pneumatic differential pressure signal generator, a pneumatic pressure output signal D is developed representing the difference between Y and P. Signal D controls a damper actuator to cause a damper in the duct to close or open until Y and P are equal; or Y=P. At that point, $V=K_5X$.

BRIEF DESCRIPTION OF THE DRAWINGS

FIG. 2 is a top plan view of a physical embodiment of a controller of the invention;

FIG. 3 is a bottom plan view of the controller of FIG. 2;

FIG. 5 is an enlarged vertical sectional view taken on the line 5—5 in FIG. 2;

FIG. 6 is an enlarged vertical sectional view taken on the line 6—6 in FIGS. 2 and 3;

FIG. 7 is an enlarged vertical sectional view taken on the line 7—7 in FIG. 2; and FIG. 8 is an enlarged horizontal sectional view taken on line 8—8 in FIG. 6.

DETAILED DESCRIPTION OF THE PREFERRED EMBODIMENTS

Figure 1:
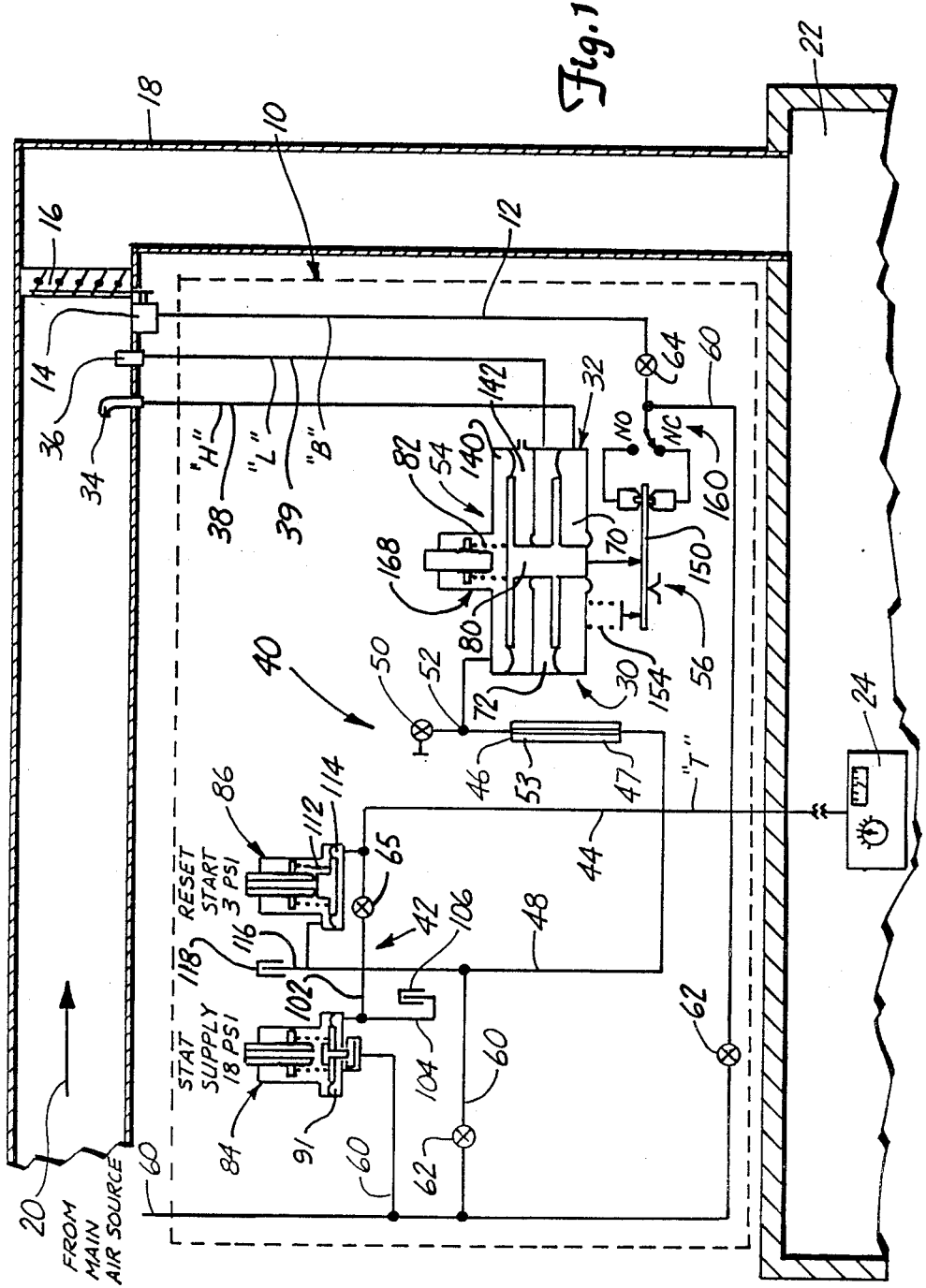
FIG. 1 is a schematic representation of the various elements of a pneumatic air volume controller of the present invention shown in relation to a passage or duct carrying conditioned air through a damper and into a defined area to be temperature controlled.

A pneumatic variable air volume controller 10 of the present invention is shown schematically in FIG. 1. The controller provides a pneumatic pressure output signal through an output signal tube and conduit 12 to a damper actuator 14 to operate a damper 16 located in a passage defining means or duct 18 to deliver conditioned air moving in the direction of the arrow 20 into a room or other defined area 22. This pneumatic pressure output signal is derived by comparing a first pneumatic pressure control signal representative of the square of the velocity of the air flow in the duct with a second pneumatic pressure control signal representative of the square of a pneumatic pressure signal from a thermostat 24 in the defined area.

A first means 30 for developing a first pneumatic pressure control signal representative of the velocity pressure in the duct 18 includes: a first pneumatic differential pressure comparator 32; a pitot tube arrangement within the duct including a total pressure pitot tube 34 which senses the total pressure H of air flowing in the duct, and a static pressure pitot tube 36 which senses the static air pressure L in the duct; a high pressure tube and conduit 38 open from the total pressure pitot tube 34 to the first differential pneumatic pressure comparator 32; and a low pressure tube and conduit 39 open from the static pressure pitot tube 36 to the first pneumatic differential pressure comparator 32.

A second means 40 for developing a second pneumatic pressure control signal representative of the square of the pneumatic pressure signal received from the thermostat includes: third means 42 for developing an intermediate pneumatic pressure signal which is a linear function of the pressure signal received from the thermostat; a thermostat pressure signal tube and conduit 44 open from the thermostat 24 to the third means 42; a capillary, here shown as a capillary tube 46; an intermediate pressure tube and conduit 48 open between third means 42 and a first inlet end 47 of the capillary tube 46; a control orifice 50 provided as part of an orifice assembly 51; and a second pneumatic pressure control signal tube and conduit 52 which is open between a second outlet end 53 of the capillary tube 46, the control orifice 50, and a second pneumatic differential pressure comparator 54.

The first pneumatic differential pressure comparator 32 and the second pneumatic differential pressure comparator 54 work together to form parts of a pneumatic differential pressure signal generator 56.

Using pneumatic pressure input from high pressure tube and conduit 38, low pressure tube and conduit 39 and the second pneumatic pressure control signal tube and conduit 52, signal generator 56 provides, through output signal tube and conduit 12 to damper actuator 14, a controller pneumatic pressure output signal representative of the difference between the first and second pneumatic pressure control signals. This controller pneumatic output pressure signal drives the damper actuator and damper to vary the volume of air flow in the duct to tend to keep the first and second pneumatic pressure control signals equal to each other.

Air under pressure is supplied to the controller 10 from a suitable pneumatic source (not shown) through a pneumatic pressure source supply tube and conduit 60. In a typical application, this supply pressure can be 20 pounds per square inch, for example. As clearly seen in FIG. 1, this air is supplied through restrictors 62 to the output signal tube and conduit 12, and intermediate pressure tube and conduit 48. A second restrictor 64 is present in output signal tube and conduit 12 between the connection of pressure source supply tube and conduit 60 and the damper actuator 14. In a typical application, restrictors having orifices of 0.005" in diameter have been found to be satisfactory.

Pressure source supply tube and conduit 60 is connected directly to a portion of the third means 42 for developing an intermediate pneumatic pressure signal which is a linear function of the pressure signal received from the thermostat at a position and in a manner to be described below.

For clarity of illustration and understanding, the representation of the first means 30 for developing a first pneumatic pressure control signal representative of the velocity pressure in the duct, the first pneumatic differential pressure comparator 32, the second pneumatic differential pressure comparator 54, and the pneumatic differential pressure signal generator 56 all appear to be upside down in the schematic representation of FIG. 1 with respect to the showing of these same elements in FIGS. 2 and 4 through 8. The second means 40 for developing a second pneumatic pressure control signal representative of the square of the pneumatic pressure signal received from the thermostat, however, is right side up in the schematic representation of FIG. 1 with respect to the showings of FIGS. 2 and 4 through 8.

Referring now more specifically to FIGS. 2 through 8, output signal tube 12, high pressure tube 38, low pressure tube 39, thermostat pressure signal tube 44, and pressure source supply tube 60 are shown positioned over appropriate nipples extending upwardly from a top portion 66 of a controller housing 68. In each situation where internal passageways in the controller housing 68 are open to the interior of one of these tubes, that passageway will be identified with the same numeral as the tube, thus identifying it as part of the same conduit.

The controller housing 68 is provided with a first comparator cavity 69. High pressure tube and conduit 38 is open to a high pressure chamber 70 of first pneumatic differential pressure comparator 32. Chamber 70 is partially defined by cavity 69. Low pressure tube and conduit 39 is open to a low pressure chamber 72 of first comparator 32. Chamber 72 is also partially defined by cavity 69. These chambers are separated by a horizontal, flexible first comparator diaphragm 74. Diaphragm 74 includes a rigid plate 76 and a flexible discoid ring 78. A vertical common stem 80 is fixedly mounted to the plate 76 at the center of diaphragm 74 and extends away from it in two opposite directions.

When there is movement of conditioned air through the duct 18 in direction of arrow 20, the total pressure exerted through pitot tube 34 will be exerted on the high pressure chamber side of the diaphragm 74 while the static pressure exerted on the pitot tube 36 will be exerted on the low pressure chamber side of that diaphragm. Thus there will be a net force tending to move the stem 80 away from high pressure chamber 70. A calibration spring 82 is positioned to bear on stem 80 to exert a force on it tending to balance off the weight of the stem and other elements associated with the stem in such a manner as to tend to keep the diaphragms in a horizontal plane when under no load.

This downward force on diaphragm 74 resulting from the subtraction of the static pressure from the total pressure, is representative of the velocity pressure of the air flowing through the conduit 18.

The third means 42 for developing an intermediate pneumatic pressure signal which is a linear function of the pressure signal received from the thermostat includes a thermostat (stat) supply regulator 84 having a body 85; and a reset start regulator 86 having an airtight body 87. A thermostat supply regulator diaphragm 88 extends across a lower portion of the supply regulator body 85, and separates a stat supply calibration compartment 89 from a regulated pressure chamber 91 both being within the stat supply regulator body 85. Diaphragm 88 supports a valve stem 90 which carries a pressure regulator valve 92 extending through the regulated pressure chamber 91 A pressure source supply chamber 94 is situated below the regulated pressure chamber 91 and is partially defined by a valve seat support wall 95 which provides a valve seat 96 which surrounds the valve stem 90 and is operatively aligned with the pressure regulator valve 92 to control the flow of air from the main supply chamber 94 into the regulated pressure chamber 91. It is to this pressure source supply chamber 94 that the previously mentioned direct, unimpeded connection from conduit 60 to means 42 is made.

In the calibration compartment 89 of the supply regulator body 85, a stat supply regulator spring 100 rests on the top of the valve stem 90. A conduit and tube 102 is open from regulated pressure chamber 91 through a third restrictor 65 to stat pressure signal tube 44. A spring tensioning adjustment assembly 101, accessible from the top of the stat supply regulator 84, provides means to vary the tension in spring 100 so that the stat supply regulator output from regulated pressure chamber 91 to the conduit and tube 102 can be adjusted, with stat pressure signal tube 44 open, to a predetermined supply pressure. For example, a supply pressure of 18 pounds per square inch has been found to be satisfactory. To make this adjustment, a stat supply gauge conduit 104 is provided so that a suitable pressure gauge (not shown) can be installed during calibration and adjustment of the supply regulator. In the drawings, this conduit is shown to be capped by a stat supply gauge conduit cap 106 as it will be during normal operation of the controller.

A reset start regulator diaphragm 110 divides the body 87 of the reset start regulator 86 into a pressure source supply chamber 112 and a thermostat (stat) signal pressure chamber 114. Chamber 112 is open to the pressure source supply tube and conduit 60 through a restrictor 62; and chamber 114 is open to the thermostat pressure signal tube and conduit 44.

Tube and conduit 102 is open between stat regulated pressure chamber 91 of stat supply regulator 84 and stat signal pressure chamber 114 of reset start regulator 86 through a restrictor 65 and conduit 44.

To set the reset start point, a monitor gauge conduit 116, open to the intermediate pressure tube and conduit 48, is provided so that an appropriate monitor gauge (not shown) can be mounted thereon. In the drawings, however, this conduit 116 is shown closed by a monitor gauge conduit cap 118 as it will be during normal operation of the controller.

In the pressure source supply chamber 112 of the reset start regulator 86, a reset start regulator spring 120 rests on a central portion of diaphragm 110. A reset point adjustment assembly 121, accessible from the top of the reset start regulator 86, provides means to vary the tension in spring 120. This adjustment assembly 121 includes an externally threaded, hollow, pressure relief pipe 124 which is open at a slotted outer end portion 126 to the atmosphere. An open inner end portion 127 of pipe 124 forms a valve seat 128 inside the chamber 112. An externally slotted, internally threaded spring tensioning nut 130 is threadably mounted on pipe 124 to be in contacting relation to an outer end of spring 120. Flange means 132, integral with interior walls of chamber 112, is provided to prevent nut 130 from rotating when pipe 124 is rotated from outside of body 87 using its slotted outer end portion 127. A raised central portion of diaphragm 110 is in alignment with pipe valve seat 128 and serves as a valve 134.

To adjust the controller 10 to reset the damper 16 upon three pounds per square inch variation in the thermostat pressure, for example, the thermostat pressure in thermostat pressure signal tube and conduit 44 will be set at three pounds per square inch and reset start regulator spring 120 will be adjusted using the reset point adjustment assembly 121 to cause the pressure on an appropriate gauge open to monitor gauge conduit 116 to read greater than zero and less than 0.3 pounds per square inch.

With the supply regulator 84 and the reset start regulator 86 appropriately calibrated, the pressure signal in the intermediate pressure tube and conduit 48 will vary in linear relationship with respect to variations in the pressure signal in the thermostat pressure signal tube and conduit 44.

As best seen in FIGS. 1 and 8, the intermediate pressure tube and conduit 48 is open to the first inlet end 47 of the capillary tube 46; and as best seen in FIGS. 1 and 6, the second outlet end 53 of the capillary tube 46 is open to the control orifice 50 which opens to the atmosphere. The second pneumatic pressure control signal tube and conduit 52 is open from between the capillary tube 46 and the orifice 50 to a portion of the second pneumatic differential pressure comparator 54.

Figure 4:
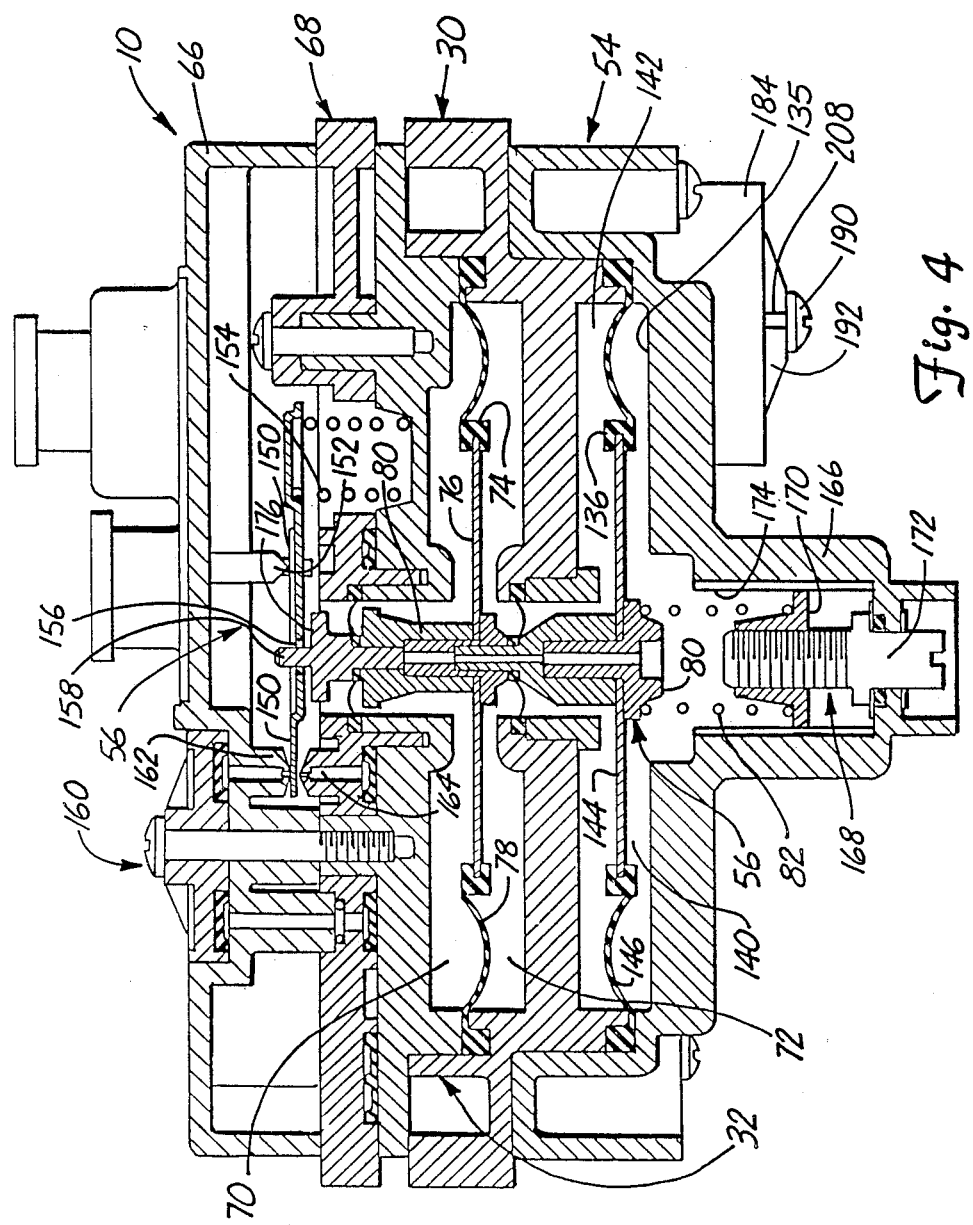
FIG. 4 is an enlarged vertical sectional view taken on the line 4—4 in FIG. 2.

As best seen in FIG. 4, within the controller housing 68, the second pneumatic differential pressure comparator 54 includes a cavity 135 and a horizontal flexible second comparator diaphragm 136 which separates the cavity into a second pneumatic pressure control signal chamber 140 and an atmospheric pressure balancing chamber 142. This balancing chamber 142 is open to the atmosphere. It is the second pneumatic pressure control signal chamber 140 to which the second pneumatic pressure control signal tube and conduit 52 is open from between the capillary tube 46 and the orifice 50.

A rigid plate 144 of the diaphragm 136 is rigidly connected to the common stem 80 of the controller 10. A flexible discoid ring 146 of diaphragm 136 connects the rigid plate to the side walls of the cavity 135 of the second comparator 54.

The pneumatic differential pressure signal generator 56 includes all of the common stem 80 and all of the various components of force exerted on it by the diaphragms 74 and 136 and the pressures exerted on those diaphragms within pressure chambers 70, 72, 140 and 142.

Also part of the signal generator 56 is a flapper lever 150, a knife edge fulcrum 152 extending downwardly from top portion 66 of controller housing 68, and a spring 154 supported on an internal wall of the controller housing 68 and tending to balance off the dead weight of the parts. Flapper lever 150 is provided with a boss-receiving opening 156 therethrough, and the common stem 80 is provided with a flapper lever alignment boss 158 extending through that opening.

On the side of the flapper lever 150 opposite the fulcrum 152, there is provided a normally open (NO)/normally closed (NC) switch assembly 160. This pneumatic switch assembly can be of any usual or preferred construction well known in the art. Such a switch assembly will provide, however, a "normally closed" bleed nozzle 162 and a "normally open" bleed nozzle 164. An end portion of the flapper lever 150 opposite the spring 154 will extend between these two nozzles and will be slightly thinner than the space between the nozzles.

The calibration spring 82 is mounted in a calibration adjustment body 166 which is integral part of the controller housing 68. Within that body is a calibration adjustment assembly 168 consisting of a calibration adjustment nut 170 holding the spring 82 up against the stem 80, and a calibration adjustment stud 172 threadably mounted in the nut 170. Flange means 174 integral with body 166 is provided to contact outer edges of nut 170 to prevent the nut from rotating when the stud 172 is rotated to adjust the tension in spring 82. This adjustment assembly 168 can be used to position an upper shoulder 176 of the stem 80 to be in closely adjacent relation to the underside of the flapper lever 150.

As explained above, the second pneumatic pressure control signal within the second pneumatic pressure control signal conduit 52 is a function of the pressure across capillary tube 46 and is a function of the pressure across the orifice 50. In order to adjust the range of these pressure drops, the effective size of orifice 50 can be adjusted. There are several ways this can be accomplished, but one way which has been found to be very satisfactory can be understood from a consideration of FIGS. 6 and 8.

As seen in FIG. 8, the control orifice 50 is a relatively tiny circular opening provided in an orifice member or plate 180 of the orifice assembly 51. The amount of air under pressure which can pass through control orifice 50 is controlled by a flat, off-center orifice adjustment plate 182 of the orifice assembly 51.

The orifice assembly 51 includes an orifice assembly housing 184 integral with and extending downwardly from the controller housing 68 as seen in FIGS. 3, 4, 6 and 8. This housing 184 is partially defined by a cylindrical inner wall 185, and this wall is provided with an orifice plate aligning notch 186 therein. The flat, cylindrical orifice plate 180 is provided with a positioning tab 188 shaped to exactly fill notch 186 to prevent any rotation of plate 180 with respect to the control orifice housing 184. An orifice adjustment plate clamping bolt or machine screw 190 is threadably mounted in the orifice housing 184 and controller housing 68 to be in the exact center of the cylindrical inner wall 185. An orifice adjustment plate cam 192 is provided with a central opening 193 of diameter to precisely receive the clamping bolt 190 and has a cylindrical outer positioning flange 194 of dimension to exactly fit in sliding, contacting relationship with the inner cylindrical wall 185 of the orifice assembly housing 184, the axis of the bolt receiving opening and the axis of the outer surface of the positioning flange 194 being coincident.

An upstanding off-center orifice adjustment plate positioning collar 196, forming an integral part of the cam 192, includes an outer cylindrical surface segment 198 intersected by an outer flat surface segment 200.

The off-center orifice adjustment plate 182 is partially defined by an outer edge cylindrical surface 202. This adjustment plate 182 is also partially defined by an inner cylindrical surface segment 204 intersected by an inner, flat surface segment 206. The size and shape of the outer surfaces 198 and 200 of the adjustment plate positioning collar 196 of the cam 192 and of provided inner surfaces 204 and 206 of the adjustment plate 182 are such that they mate snugly with each other when the orifice plate 180 and the orifice adjustment plate 182 are in the orifice assembly housing 184 with the orifice adjustment plate cam 192 passing through them, and with the orifice adjustment plate clamping bolt 190 passing through the central opening 193 in the cam and threadably mounted in the orifice housing 184.

The center of the outer cylindrical segment 198 of the collar 196 of cam 192 is offset slightly from the center of central bolt receiving opening 193 through the cam. When the diameter of control orifice 50 is 0.024 inches, the offset between the center of segment 198 and the center of bolt opening 193 can be 0.012 inches, for example. The offset between the center of the inner cylindrical segment 204 of orifice adjustment plate 182 and the center of the outer edge cylindrical surface 202 of that plate can also be offset by 0.012 inches. With the parts positioned as seen in FIG. 8, it will be evident that rotation of cam 192 through 180° will move the control plate through a position completely covering orifice 50 and a position completely clear of that orifice.

A series of positioning gussets 208 extend integrally downwardly from the cam 192 as best seen in FIGS. 3 and 6, and can be moved with respect to a set of indicia on the outside edge of the orifice housing 184. Then, with the bolt 190 loosened, the gussets 208 can be used to rotate the cam 192, and consequently the off-center orifice opening control plate 182 to uncover more or less of the control orifice 50. Once the desired positioning is obtained, the bolt 190 will be tightened down to firmly fix the cam 192 and plate 182 with respect to the control orifice 50. Preferably, this adjustment will be accomplished during the manufacture of the controller 10, and will not have to be reset during its useful life.

The upper side of the orifice plate 180, as seen in FIG. 6, is open to the second pneumatic pressure control signal tube and conduit 52. After the air in conduit 52 passes through control orifice 50 in plate 180, it passes into the atmosphere through a much larger opening or exhaust port 210 in the cam 192 and so into the atmosphere without affecting the pressure developed in conduit 52 due to the flow of air entering from the capillary tube 46 and the flow of air exiting through the control orifice 50.

When the controller of the invention is in operation for its intended purpose, a first pneumatic pressure control signal representative of the velocity pressure in duct 18 will be exerted on the common stem 80 by action of the forces on both sides of first comparator diaphragm 74. This signal will vary as the square of the velocity of the air flow in the duct. This air flow velocity can be controlled by operation of damper 16 by damper operator 14.

An intermediate stat pressure control signal which varies directly with the temperature at thermostat 24 is delivered into a first end of the capillary tube 46. A second end of that tube opens to the second pneumatic pressure control signal tube and conduit 52, and this conduit 52 is provided with a control orifice 50 which opens to the atmosphere. The pressure in the second pneumatic pressure control signal conduit 52 varies as the square of the intermediate pressure signal developed by the thermostat; and this second pneumatic pressure signal is likewise applied to the common stem 80 through the instrumentality of second comparator diaphragm 136.

When sufficient volume of heated air, for example, is flowing in the duct 18 to satisfy the requirements of the thermostat 24, the forces on common stem 80 will be in balance, and, consequently, the pneumatic pressure output signal in output signal tube and conduit 12 will be such as to cause the damper actuator 14 to hold the damper in a static condition. When more or less heat, for example, is called for by thermostat 24, the stem 80 will be moved in one direction or the other to cause the pneumatic differential pressure signal generator 56 to release more or less air through the appropriate bleed nozzle 162 or 164 to cause damper actuator 14 to vary the positioning of damper 16 to tend to supply more or less air flow in duct 18 to satisfy the needs of thermostat 24.

Although the present invention has been described with reference to preferred embodiments, workers skilled in the art will recognize that changes may be made in form and detail without departing from the spirit and scope of the invention.

What is claimed is:

1. In a pneumatic variable air volume controller for controlling the supply of conditioned air through a passage to a defined area, the controller including first means for developing a first pneumatic pressure control signal from a pneumatic source representative of the velocity pressure of air flowing in the passage; second means for developing a second pneumatic pressure control signal from a pneumatic source responsive to the temperature in the defined area; third means responsive to the differences between said first and second pneumatic pressure control signals for generating a pneumatic pressure output signal for driving a damper actuator to control a damper in said passage to vary the volume of air flow in the passage to tend to balance the first and second pneumatic pressure control signals against each other, the pneumatic pressure output signal resulting from a substantially linear response both to the velocity of the air flow in said passage and to the temperature in said defined area; the improvement wherein:

(a) the first means includes a first pneumatic differential pressure comparator for developing a first pneumatic pressure control signal which varies as the square of the velocity of the air flow in the passage;

(b) the second means includes means for using a pneumatic signal which is a linear representation of the temperature in the defined area for developing the second pneumatic pressure control signal which varies with the area temperature as the square of that temperature; and (c) the third means includes a second differential pressure comparator for comparing these first and second pneumatic pressure control signals to generate a pneumatic pressure output signal representative of the difference between the first and second control signals for controlling a damper actuator to cause a damper to vary the volume of air flow in the passage to tend to cause the first and second pneumatic pressure control signals to come into balance.

2. In a pneumatic variable air volume controller for controlling the supply of conditioned air through a pressure to a defined area, the controller including first means for developing a first pneumatic pressure control signal from a pneumatic source. representative of the velocity pressure of air flowing in the passage; second means for developing a second pneumatic pressure control signal from a pneumatic source responsive to the temperature in the defined area; a third means responsive to the differences between said first and second pneumatic pressure control signals for generating a pneumatic pressure output signal for driving a damper actuator to control a damper in said passage to vary the volume of air flow in the passage to tend to balance the first and second pneumatic pressure control signals against each other, the pneumatic pressure output signal resulting from a substantially linear response both to the velocity of the air flow in said passage and to the temperature in said defined area; the improvement wherein:

(a) the first means includes a first pneumatic differential pressure comparator for developing a first pneumatic pressure control signal which varies as the square of the velocity of the air flow in the passage;

(b) the second means includes means for using a pneumatic signal which is a linear representation of the temperature in the defined area for developing the second pneumatic pressure control signal which varies with the area temperature as the square of that temperature;

(c) the third means includes a second differential pressure comparator for comparing these first and second pneumatic pressure control signals to generate a pneumatic pressure output signal representative of the difference between the first and second control signals for controlling a damper actuator to cause a damper to vary the volume of air flow in the passage to tend to cause the first and second pneumatic pressure control signals to come into balance;

(d) the second means includes:
(1) a capillary,
(2) an orifice member provided with a control orifice therethrough,
(3) an intermediate conduit delivering a pneumatic pressure signal which is a linear representation of the temperature in the defined area into a first end of the capillary, and
(4) a thermostat pneumatic pressure signal conduit receiving the resulting pneumatic pressure signal from a second end of the capillary and delivering it to a first side of the orifice member for discharge through the orifice into the atmosphere; and (e) the thermostat pneumatic pressure signal conduit is open to the third means to deliver the pneumatic pressure signal existing between the capillary and the control orifice to the second differential pressure comparator as the second pneumatic pressure control signal.

3. The controller of claim 2 wherein:
(f) the second pneumatic pressure control signal and the first pneumatic pressure control signal are compared in the second differential pressure comparator to develop a pneumatic pressure output signal representative of the difference between the first pneumatic pressure control signal and the second pneumatic pressure control signal; and (g) the output signal is used to drive a damper actuator to cause a damper in the passage to vary the volume of air flowing to the defined area to control the temperature in the area so as to tend to keep the first and second signals in balance with each other.

4. The pneumatic air volume controller of claim 3 wherein:
(h) the controller includes:
(1) a controller housing defining a first comparator cavity and a second comparator cavity,
(2) a flexible first comparator diaphragm extending across the first comparator cavity and defining with that cavity a high pressure chamber on one side of said first diaphragm and a low pressure chamber on the other side of that diaphragm,
(3) a flexible second comparator diaphragm extending across the second comparator cavity and defining with that cavity an atmospheric pressure balancing chamber on one side of said second diaphragm and a second pneumatic pressure control signal chamber on the other side of that diaphragm,
(4) a elongate common stem extending through central portions of each of the diaphragms in such a manner that pressures existing in the high pressure chamber, the low pressure chamber, the second pneumatic pressure control signal chamber and the atmospheric pressure balancing chamber will be exerted simultaneously on the stem through the first and second flexible diaphragms with the result that the resulting force along the longitudinal axis of the stem will tend to move the stem on that longitudinal axis,
(5) a pneumatic differential pressure signal generator including a member in operable contact with the common stem and operative to control the magnitude and direction of the pneumatic pressure output signal responsive to the amount and direction of movement of the stem with respect to the controller housing; and (i) wherein the maximum pressure in the passage is introduced into the high pressure chamber, the static pressure in the passage is introduced into the low pressure chamber, the pneumatic pressure control signal existing between the capillary and the control orifice is introduced into the second pneumatic pressure control signal chamber, and atmospheric pressure is introduced into the atmospheric pressure balancing chamber.

5. In a pneumatic variable gas volume controller for controlling the supply of gas through a passage, the controller including first means for developing a first pneumatic pressure control signal from a pneumatic source representative of the velocity pressure of the gas flowing in the passage; second means for developing a second pneumatic pressure control signal which varies directly with changes in another measurable condition; third means responsive to the differences between said first and second pneumatic pressure control signals for generating a pneumatic pressure output signal for driving a gas flow volume control means to vary the volume of gas flow in the passage to tend to balance the first and second pneumatic pressure control signals against each other, the pneumatic pressure output signal resulting from a substantially linear response both to the velocity of the gas flow in the passage and to the magnitude of the other measurable condition; the improvement wherein:

(a) the first means includes a first pneumatic differential pressure comparator for developing a first pneumatic pressure control signal which varies as the square of the velocity of the gas flow in the passage;

(b) the second means includes means for using a pneumatic signal which is a linear representation of the other measurable condition for developing the second pneumatic pressure control signal which varies with the magnitude of the other measurable condition as the square of that magnitude; and (c) the third means includes a second differential pressure comparator for comparing these first and second pneumatic pressure control signals to generate a pneumatic pressure output signal representative of the difference between the first and second control signals for controlling a gas flow control means to vary the volume of gas flow in the passage to tend to cause the first and second pneumatic pressure control signals to come into balance.

6. In a pneumatic variable gas volume controller for controlling the supply of gas through a passage, the controller for controlling the supply of gas through a passage, the controller including first means for developing a first pneumatic pressure control signal from a pneumatic source representative of the velocity pressure of the gas flowing in the passage; second means for developing a second pneumatic pressure control signal which varies directly with changes in another measurable condition; third means responsive to the differences between said first and second pneumatic pressure control signals for generating a pneumatic pressure output signal for driving a gas flow volume control means to vary the volume of gas flow in the passage to tend to balance the first and second pneumatic pressure control signals against each other, the pneumatic pressure output signal resulting from a substantially linear response both to the velocity of the gas flow in the passage and to the magnitude of the other measurable condition; the improvement wherein:
(a) the first means includes a first pneumatic differential pressure comparator for developing a first pneumatic pressure control signal which varies as the square of the velocity of the gas flow in the passage;
(b) the second means includes means for using a pneumatic signal which is a linear representation of the other measurable condition for developing the second pneumatic pressure control signal which varies with the magnitude of the other measurable condition as the square of that magnitude;
(c) the third means includes a second differential pressure comparator for comparing these first and second pneumatic pressure control signals to generate a pneumatic pressure output signal representative of the difference between the first and second control signals for controlling a gas flow control means to vary the volume of gas flow in the passage to tend to cause the first and second pneumatic pressure control signals to come into balance;
(d) the second means also includes:
  (1) a capillary,
  (2) an orifice member provided with a control orifice therethrough,
  (3) an intermediate conduit delivering a pneumatic pressure signal which is a linear representation of the magnitude of the other measurable condition into a first end of the capillary, and
  (4) an other condition pneumatic pressure signal conduit receiving the resulting pneumatic pressure signal from a second end of the capillary and delivering it to a first side of the orifice member for discharge through the orifice into the atmosphere; and
(e) the other condition pneumatic pressure signal conduit is open to the third means to deliver the pneumatic pressure signal existing between the capillary and the control orifice to the second differential pressure comparator as the second pneumatic pressure control signal.

7. The controller of claim 6 wherein:
(f) the second pneumatic pressure control signal and the first pneumatic pressure control signal are compared in the second differential pressure comparator to develop a pneumatic pressure output signal representative of the difference between the first pneumatic pressure control signal and the second pneumatic pressure control signal; and
(g) the output signal is used to drive a gas flow volume control means to vary the volume of gas flow so as to tend to keep the first and second signals in balance with each other.

8. The pneumatic air volume controller of claim 7, wherein:
(h) the controller includes:
  (1) a controller housing defining a first comparator cavity and a second comparator cavity,
  (2) a flexible first comparator diaphragm extending across the first comparator cavity and defining with that cavity a high pressure chamber on one side of said first diaphragm and a low pressure chamber on the other side of that diaphragm, second comparator
  (3) a flexible diaphragm extending across the second comparator cavity and defining with that cavity an atmospheric pressure balancing chamber on one side of said second diaphragm and a second pneumatic pressure control signal chamber on the other side of that diaphragm,
  (4) a elongate common stem extending through central portions of each of the diaphragms in such a manner that pressures existing in the high pressure chamber, the low pressure chamber, the second pneumatic pressure control signal chamber and the atmospheric pressure balancing chamber will be exerted simultaneously on the stem through the first and second flexible diaphragms with the result that the resulting force along the longitudinal axis of the stem will tend to move the stem on that longitudinal axis,
  (5) a pneumatic differential pressure signal generator including a member in operable contact with the common stem and operative to control the magnitude and direction of the pneumatic pressure output signal responsive to the amount and direction of movement of the stem with respect to the controller housing; and
(i) wherein the maximum pressure in the passage is introduced into the high pressure chamber, the static pressure in the passage is introduced into the low pressure chamber, the pneumatic pressure control signal existing between the capillary and the control orifice is introduced into the second pneumatic pressure control signal chamber, and atmospheric pressure is introduced into the atmospheric pressure balancing chamber.

9. In a pneumatic variable air volume controller for controlling the supply of conditioned air through a passage to a defined area, the controller including first means for developing a first pneumatic pressure control signal from a pneumatic source representative of the velocity pressure of air flowing in the passage; second means for developing a second pneumatic pressure control signal from a pneumatic source responsive to the temperature in the defined area; third means responsive to the differences between said first and second pneumatic pressure control signals for generating a pneumatic pressure output signal for driving a damper actuator to control a damper in said passage to vary the volume of air flow in the passage to tend to balance the first and second pneumatic pressure control signals against each other, the pneumatic pressure output signal resulting from a substantially linear response both to the velocity of the air flow in said passage and to the temperature in said defined area; the improvement wherein:
(a) the first means includes a first pneumatic differential pressure comparator for developing a first pneumatic pressure control signal by subtracting the static pressure from the total pressure of air flowing in said passage to yield a first pneumatic pressure control signal which varies as the square of the velocity of the air flow in the passage;
(b) the second means includes means for using a pneumatic signal which is a linear representation of the temperature in the defined area for developing the second pneumatic pressure control signal which varies with the area temperature as the square of that temperature; and
(c) the third means includes a second differential pressure comparator for comparing these first and second pneumatic pressure control signals to generate a pneumatic pressure output signal representative of the difference between the first and second control signals for controlling a damper actuator to cause a damper to vary the volume of air flow in the passage to tend to cause the first and second pneumatic pressure control signals to come into balance.

10. In a pneumatic variable air volume controller for controlling the supply of condition air through a passage to a defined area, the controller including first means for developing a first pneumatic pressure control signal from a pneumatic source representative of the velocity pressure of air flowing in the passage; second means for developing a second pneumatic pressure control signal from a pneumatic source responsive to the temperature in the defined area; third means responsive to the differences between said first and second pneumatic pressure control signals for generating a pneumatic pressure output signal for driving a damper actuator to control a damper in said passage to vary the volume of air flow in the passage to tend to balance the first and second pneumatic pressure control signals against each other, the pneumatic pressure output signal resulting from a substantially linear response both to the velocity of the air flow in said passage and to the temperature in said defined area; the improvement wherein:

(a) the first means includes a first pneumatic differential pressure comparator for developing a first pneumatic pressure control signal by subtracting the static pressure from the total pressure of air flowing in said passage to yield a first pneumatic pressure control signal which varies as the square of the velocity of the air flow in the passage;

(b) the second means includes means for using a pneumatic signal which is a linear representation of the temperature in the defined area for developing the second pneumatic pressure control signal which varies with the area temperature as the square of that temperature;

(c) the third means includes a second differential pressure comparator for comparing these first and second pneumatic pressure control signals to generate a pneumatic pressure output signal representative of the difference between the first and second control signals for controlling a damper actuator to cause a damper to vary the volume of air flow in the passage to tend to cause the first and second pneumatic pressure control signals to come into balance;

(d) the second means also includes:
  (1) a capillary,
  (2) an orifice member provided with a control orifice therethrough,
  (3) an intermediate conduit delivering a pneumatic pressure signal which is a linear representation of the temperature in the defined area into a first end of the capillary, and
  (4) a thermostat pneumatic pressure signal conduit receiving the resulting pneumatic pressure signal from a second end of the capillary and delivering it to a first side of the orifice member for discharge through the orifice into the atmosphere; and (e) the thermostat pneumatic pressure signal conduit is open to the third means to deliver the pneumatic pressure signal existing between the capillary and the control orifice to the second differential pressure comparator as the second pneumatic pressure control signal.

11. The controller of claim 10 wherein:

(f) the second pneumatic pressure control signal and the first pneumatic pressure control signal are compared in the second differential pressure comparator to develop a pneumatic pressure output signal representative of the difference between the first pneumatic pressure control signal and the second pneumatic pressure control signal; and (g) the output signal is used to drive a damper actuator to cause a damper in the passage to vary the volume of air flowing to the defined area to control the temperature in the area so as to tend to keep the first and second signals in balance with each other.

* * * * *

UNITED STATES PATENT AND TRADEMARK OFFICE
CERTIFICATE OF CORRECTION

PATENT NO. : 4,957,238
DATED : September 18, 1990
INVENTOR(S) : Paul E. Kreuter

It is certified that error appears in the above-identified patent and that said Letters Patent is hereby corrected as shown below:

Col. 15, line 6, delete "condition", insert --conditioned--.

Signed and Sealed this

Fifth Day of May, 1992

*Attest:*

DOUGLAS B. COMER

*Attesting Officer*     *Acting Commissioner of Patents and Trademarks*